US007245918B2

(12) United States Patent
Nikkelen et al.

(10) Patent No.: US 7,245,918 B2
(45) Date of Patent: Jul. 17, 2007

(54) DISTRIBUTING SHARED NETWORK ACCESS INFORMATION IN A SHARED NETWORK MOBILE COMMUNICATIONS SYSTEM

(75) Inventors: Vincent Johannes Wilhelmus Nikkelen, Budapest (HU); Pompeo Santoro, Baronissi (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 667 days.

(21) Appl. No.: 10/245,720

(22) Filed: Sep. 18, 2002

(65) Prior Publication Data

US 2004/0053632 A1   Mar. 18, 2004

(51) Int. Cl.
*H04Q 7/20* (2006.01)
(52) U.S. Cl. .................. 455/443; 455/436; 455/448
(58) Field of Classification Search ........ 455/436–444, 455/446, 448, 432.1, 435.2; 370/331
See application file for complete search history.

(56) References Cited

U.S. PATENT DOCUMENTS

| | | | |
|---|---|---|---|
| 6,243,582 B1 * | 6/2001 | Lahtinen ................ | 455/436 |
| 6,400,951 B1 * | 6/2002 | Vaara ..................... | 455/436 |
| 2002/0123348 A1 * | 9/2002 | Willars et al. ........... | 455/436 |
| 2003/0040313 A1 * | 2/2003 | Hogan et al. ............ | 455/435 |

FOREIGN PATENT DOCUMENTS

| | | |
|---|---|---|
| GB | 2352586 | 1/2001 |
| WO | 02/065789 | 8/2002 |
| WO | 02-065808 | 8/2002 |
| WO | 02/093955 | 11/2002 |

OTHER PUBLICATIONS

3rd Generation Partnership Project TSG CN WG4 Meeting #15, Change Request 23.003 CR 050 rev 1, version 5.3.0, Helsinki, Finland, Jul. 29-Aug. 2, 2002.*
3GPP TR R3.012 V0.4.0 (Jul. 2002) Technical Report "3rd Generation Partnership Project; Technical Specification Group" (TSG) RAN3; Shared Network Support in Connected Mode (Release5); ftp://ftp.3gpp.org/tsg_ran/WG3_Iu/R3_internal_TRs/R3.012_Shared_network/v0.4.0/021809_TRR3.012 Vo.4.0.zip.
3GPP TS-RAN WG3 TSGR3 Meeting # 31, Arlanda, Sweden Aug. 12-23, 2002; Tdoc R3-022171 "Shared Networks in RANAP—Information Transfer" Nortel/Siemens; ftp://ftp.3gpp.org/tsg_ran/WG3_Iu/TSGR3_31/Docs/R3-022171_CR504r2 (Shared Network in RANAP—Info Trans).zip.
EP Search Report dated Jul. 24, 2003.
International Search Report PCT/SE03/01342.

* cited by examiner

*Primary Examiner*—Edward F. Urban
*Assistant Examiner*—Raymond S. Dean
(74) *Attorney, Agent, or Firm*—Nixon & Vanderhye P.C.

(57) ABSTRACT

Shared network area (SNA) information is distributed using indicators that represent the SNA information. First SNA information for a first group of first network mobile subscribers is mapped to a first SNA indicator. Similarly, (SNA) information for a second group of second network mobile subscribers is mapped to the second SNA indicator. Those mappings are established in a core network node and sent to radio network nodes and used to determine from the SNA mappings the network access restrictions for a subscriber. The network access restriction information is not sent—only the indicator. The indicator is used to ensure that the cell selected to establish a call connection or for a handover is permitted based on the SNA information.

12 Claims, 6 Drawing Sheets

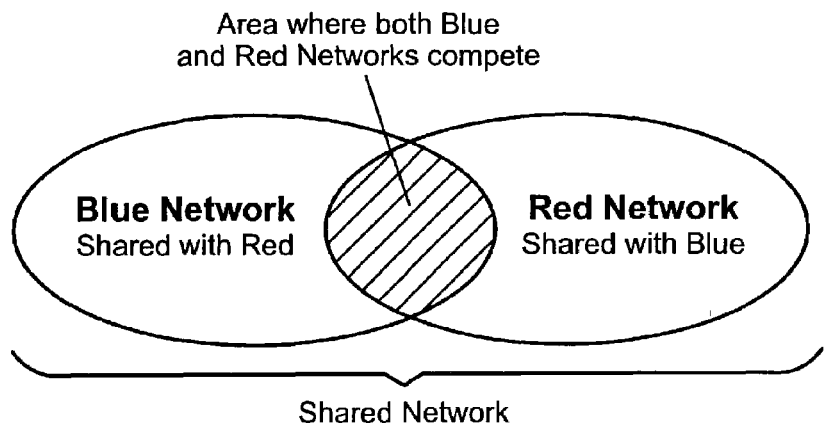
Fig. 1
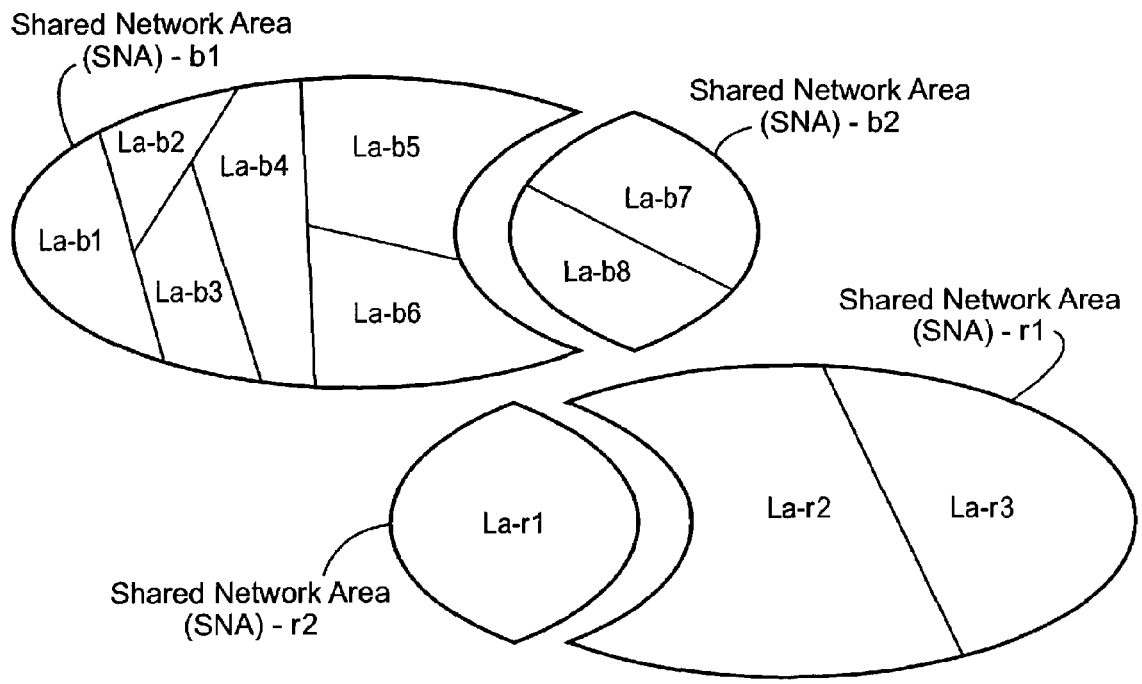
Fig. 3A
Location Area (LA) - Shared Network Area (SNA) Mapping
| Location Area's | SNA-Id |
|---|---|
| La-b1, La-b2, La-b3, La-b4, La-b5, La-b6 | SNA-b1 |
| La-b7, La-b8 | SNA-b2 |
| La-r1 | SNA-r2 |
| La-r2, La-r3 | SNA-r1 |
Fig. 3B

| SNA-information | SNA Indicator |
|---|---|
| SNA-b1, SNA-b2, SNA-r1, SNA-b3 | 1 |
| SNA-b1, SNA-r2, SNA-r1, SNA-r3 | 2 |

DISTRIBUTING SHARED NETWORK ACCESS INFORMATION IN A SHARED NETWORK MOBILE COMMUNICATIONS SYSTEM

FIELD OF THE INVENTION

The present invention relates to mobile radio communications, and in particular, to shared network mobile communications systems.

BACKGROUND

Since the public mobile radio systems were introduced in the late 1970s and early 1980s, several "generations" of mobile radio communication systems have evolved in different parts of the world. First generation (1G) systems used analog frequency modulation at the radio and digital control of the network. Second generation (2G) systems are based on Time Division Multiple Access (TDMA). An example of a 2G system is the Global System for Mobile Communications (GSM). Work is ongoing in third generation (3G) systems based on Wideband Code Division Multiple Access (WCDMA). An example of a 3G system is a Universal Mobile Telecommunication System (UMTS).

Third generation systems are backward compatible with other types of radio systems—like GSM—so that multimode User Equipment (UE) can obtain service from both 2G and 3G systems. This requires that the multimode UEs and the 2G and 3G infrastructure all support inter-system handover from a cellular that employs one type of radio access technology to another cellular system that employs a different type of radio access technology, e.g., from GSM/TDMA to UMTS/TDMA. Commonly assigned U.S. patent applications Ser. No. 09/286,472, filed on Apr. 9, 1999 and entitled, "Inter-System Handover—Generic Handover Mechanism," describes one mechanism for accomplishing such intersystem handovers, the disclosure of which is incorporated herein by reference.

In addition to coordinating inter-system handovers, network operators may share their network in order to extend network coverage and provide other extended network services to their respective subscribers. Shared networks may be geographically split or they maybe commonly shared. In a geographically split network, each operator covers a different geographical area with its respective network. Consider an example where two cellular network operators A and B share each other's network to provide their subscribers with cellular coverage over an entire country. Operator A's network may cover one half of the country, and operator B's network covers the other half. Network sharing allows both network's mobile subscribers to have service throughout the entire country. A problem arises when the two networks overlap, e.g., in the middle of the country. In that overlapping area, service can be provided by either operator's network. Naturally, each operator would like its subscribers to use its network in this overlap area, with access to the other operator's network restricted or prohibited. In other words, each operator wants to service its own subscribers using its own infrastructure whenever possible.

In one likely shared network example, a UMTS is shared by network operators A, B, and C, and each operator has its own GSM network overlapping the UMTS and the other GSM networks. The problem arises when a user equipment (UE) is leaving the UMTS network area that is not overlapped by any of the GSM networks and must be handed over into an area where the UMTS and the three GSM networks overlap. In this situation, it would be desirable to restrict which GSM network cells are possible candidates for handover. For example, if the UE is a subscriber of operator A, it would be desirable to restrict the GSM handover candidate cells for that UE to those belonging to operator A's GSM network. A GSM cell belonging to operator B or C should only be selected if no cell in A's network is available.

One approach to solving this problem is to provide shared network access/restriction information to every network node involved in handover decision making. The difficulty with this approach is the need to distribute large volumes of shared network area (SNA) information with high frequency to many nodes. Such SNA access data must be sent to the radio access network at every call setup and must also be included in every handover/relocation message. This frequent SNA signaling containing substantial amounts of SNA data requires considerable bandwidth. In addition to significant bandwidth resources being consumed, signaling protocol messages typically have maximum lengths so there may not even be sufficient room to carry the necessary SNA information.

The present invention solves these problems with distributing SNA information using indicators that represent the SNA information. SNA information for a first group of first network mobile subscribers is mapped to a first indicator. Similarly, second shared access network information for a second group of second network mobile subscribers is mapped to the second indicator. Those mappings are established in a core network node and sent to radio network nodes involved in call connection setup and/or handover. The radio network nodes store these mappings for future use.

When a call connection is being set up (or soon thereafter) with one of the first network mobile subscribers, a core network node sends the first indicator to the radio network node handling the connection set up. That radio network node uses the first indicator to determine from its stored SNA table the network access restrictions for this subscriber. The shared network access restriction information is not sent—only the indicator.

If a handover is requested for the call connection from the first radio network node to a second radio network node, the first indicator is sent to the second radio network node. The second radio network node uses the first indicator to determine from its SNA mapping the network access restrictions for this subscriber. Based on the determined network access restrictions, the second radio network node selects an appropriate cell for the handover.

Thus, in shared network situations, using SNA indicators conserves resources every time a call is set up and every time a call is handed over. Sending only the SNA indicator rather than all of the SNA information reduces signaling complexity and volume. This allows network operators to efficiently control which network cells are permitted as viable handover candidates.

BRIEF DESCRIPTION OF THE DRAWINGS

The foregoing and other objects, features, and advantages of the present invention may be more readily understood with reference to the following description taken in conjunction with the accompanying drawings.

FIG. 1 illustrates an example of a shared network;

FIG. 3A shows two network operators with plural shared network areas each divided into one or more location areas;

FIG. 3B illustrates a location area—shared network area mapping table;

DETAILED DESCRIPTION

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details. Therefore, even though one example embodiment is described below in the context second generation systems such as GSM and third generation systems such as UMTS, the invention is generically applicable to any kind system where distribution of shared network access/restriction information is desirable.

In some instances, detailed descriptions of well-known methods, interfaces, devices, and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

FIG. 1 is a high level illustration of a shared network. The network labeled "blue" on the left is shared with the network labeled "red" on the right. Blue subscribers receive service from the blue network when they are in the blue network area and from the red network when they are in the red network area. In the overlapping area indicated by crosshatched lines, both the blue and red networks compete to provide service to subscribers. Typically, network operators want to ensure they service their own subscribers in these competing areas. Shared network area (SNA) restrictions allow operators to decide in advance which network operator cells or other coverage areas may be considered as handover candidates for a UE connection in overlapping/ competing areas.

Figure 2:
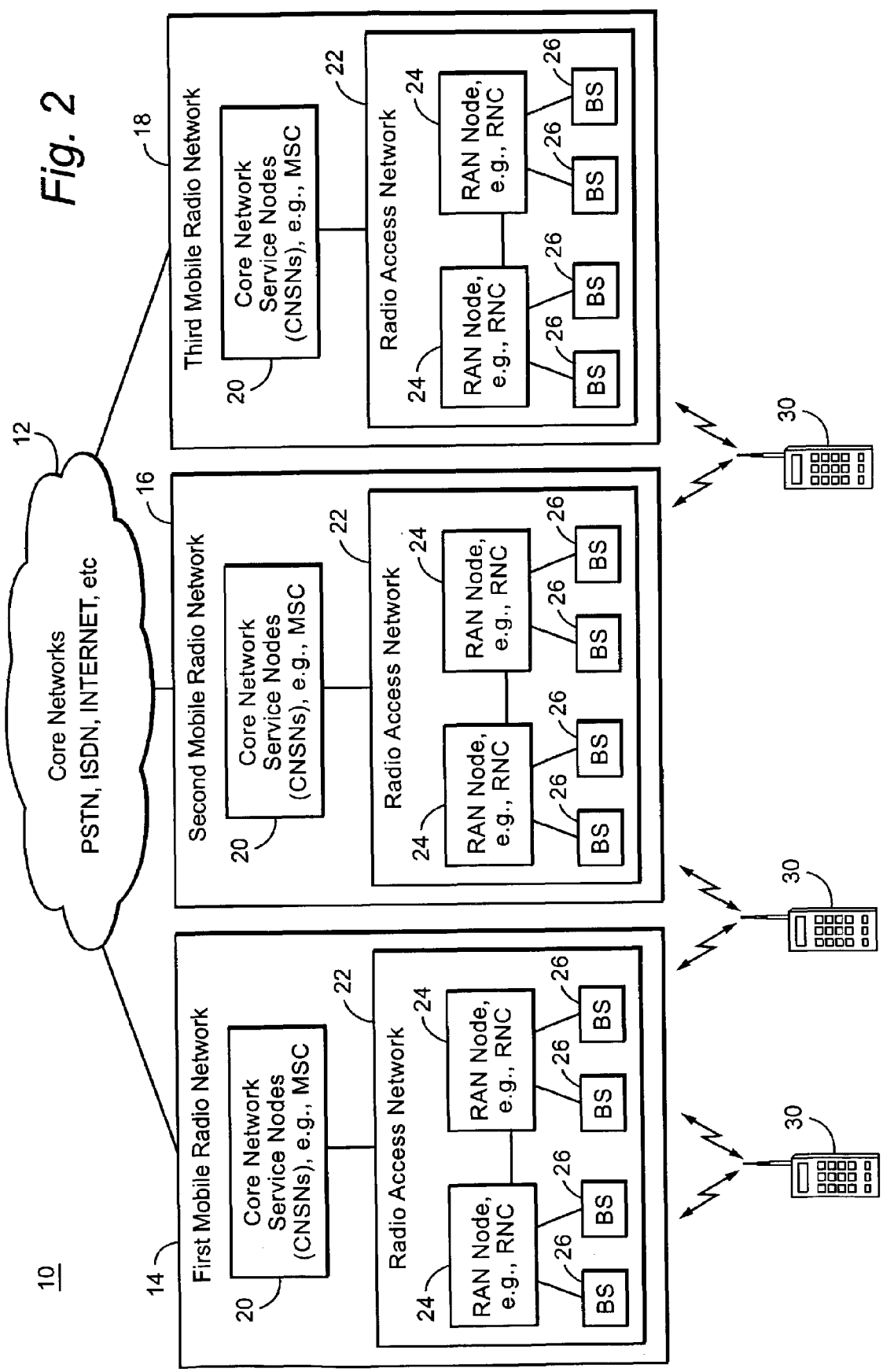
FIG. 2 illustrates a system with different radio networks that permit intra-system handovers of mobile radio connections, and at least under some circumstances, inter-system handovers of mobile radio connections.

Reference is made to a communications system illustrated in FIG. 2 and indicated generally at 10. The communication system 10 includes first, second, and third mobile radio communication systems 14, 16, and 18, respectively, that employ either the same or different types of radio access technology and may be operated by different network operators. Each mobile radio system 14, 16, and 18 is coupled to one or more core networks represented generally as a cloud 12. Example core networks include a public switched telephone network (PSTN), an integrated services digital network (ISDN), the Internet, etc. Each mobile radio system 14, 16, and 18 includes one or more core network service nodes (CNSNs) 20 coupled to a generic radio access network (RAN) 22. The radio access network 22 includes one or more generic RAN nodes 24 which communicate together. Each RAN node controls plural generic radio base stations (BSs) 26. Communications with mobile radio user equipments (UEs) 30 are by way of a radio interface. One UE 30 is shown between two base stations 26 coupled to two different RAN nodes 24 and represents an intra-system handover. Two of the UEs 30 are shown between two of the mobile communication systems representing inter-systems handovers. Technical details core network service nodes and numerous radio access networks, (e.g., networks like GSM, DAMPS, UMTS, CDMA 2000, etc.), are well known to those skilled in the art.

FIG. 3A illustrates the shared network of FIG. 1 with the blue network shown separately from the red network and each network divided into location areas (LA). The blue network is divided into eight location areas LA-B1–LA-B8. Each location area may include one or more cells, each cell being serviced by a radio base station. The red network includes three location areas LA-R1–LA-R3. One or more location areas may be associated with a particular shared network area. The blue network includes two shared network areas: SN area-B1 and SN area-B2. The red network also includes two shared network areas: SN area-RI and SN area-R2. SN area-B2 and SN area-R2 correspond to the overlapping areas of the blue and red networks where the two networks compete. SNA-B1 and SNA-R1 correspond to the areas where the two networks share their network with each other's subscriber.

A core network node, e.g., a mobile switching center (MSC), creates and stores a mapping between location areas and shared network areas. Such a mapping for the example in FIG. 3A is shown in table form in FIG. 3B. The shared network area identifier effectively grants access rights to a mobile subscriber to certain parts of the shared network. This mapping information can be distributed to all of the RAN nodes in each of the blue and red networks. When the RAN node receives this mapping of location areas to shared network areas, it sends a positive response in order to inform the core network node that the RAN node support shared network area access restrictions. The core network node now knows it can notify the RAN node every time the mapping changes or is otherwise updated. Alternatively, the operator may manually configure this mapping information in the RAN nodes.

FIG. 4A illustrates overlapping blue and red shared networks as UMTS type networks. Both the blue and red UMTS networks include their own GSM networks (represented by the solid and dashed large ellipses) that are not shared. One important aspect of the present invention is the use of a shared network area (SNA) indicator to communicate SNA access/restriction information for use in establishing call connections and/or making call handovers. Rather than sending large amounts of SNA information that would need to be signaled to all RAN nodes so that they are aware of the SNA access restrictions for each subscriber for each call setup and call handover, SNA indicators are sent instead. An SNA indicator can be as simple as a one or two bit flag.

Figures 4, 5:
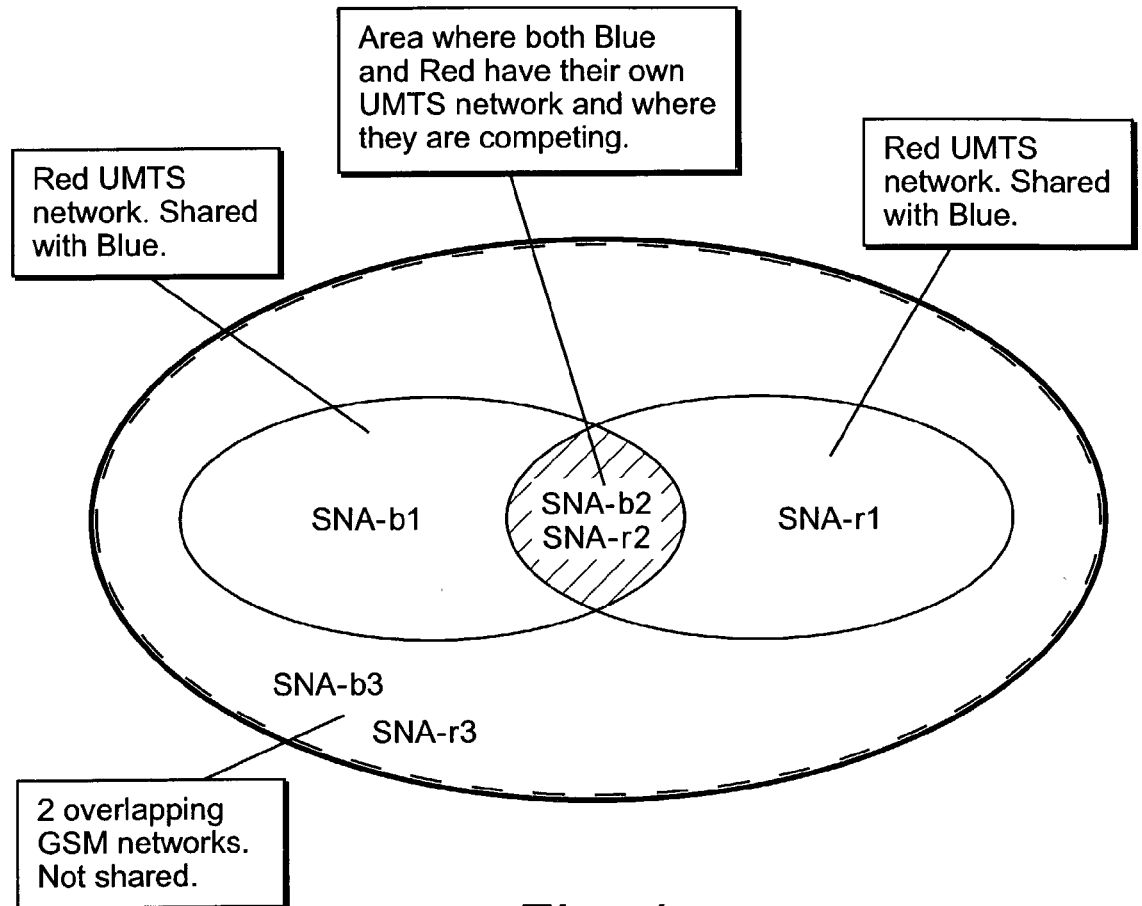
FIG. 4 illustrates another shared network example.
FIG. 5 illustrates an SNA information—SNA indicator mapping table.

A mapping between SNA information and a corresponding SNA indicator for the shared network example shown in FIG. 4 is illustrated in table form in FIG. 5. The shared network information for SNA-B1, SNA-B2, SNA-R1, and SNA-B3 is assigned a single SNA indicator 1. The other SNA information group corresponding to SNA-B1, SNA-R2, SNA-R1, and SNA-R3 has a corresponding SNA indicator 2. Thus, in the first SNA group corresponding to SNA indicator 1, a mobile subscriber is permitted access into shared network areas B1, B2, R1, and B3 but not shared network areas R2 and R3. Conversely, mobile subscribers with a corresponding SNA indicator 2 are permitted access in shared network areas B1, R2, R1, and R3 but not shared network access areas B2 and B3. In the overlapping coverage areas where the blue and red network operators compete, each operator wants to ensure that its own subscribers use its network in these overlapping, competing areas.

Figure 6:
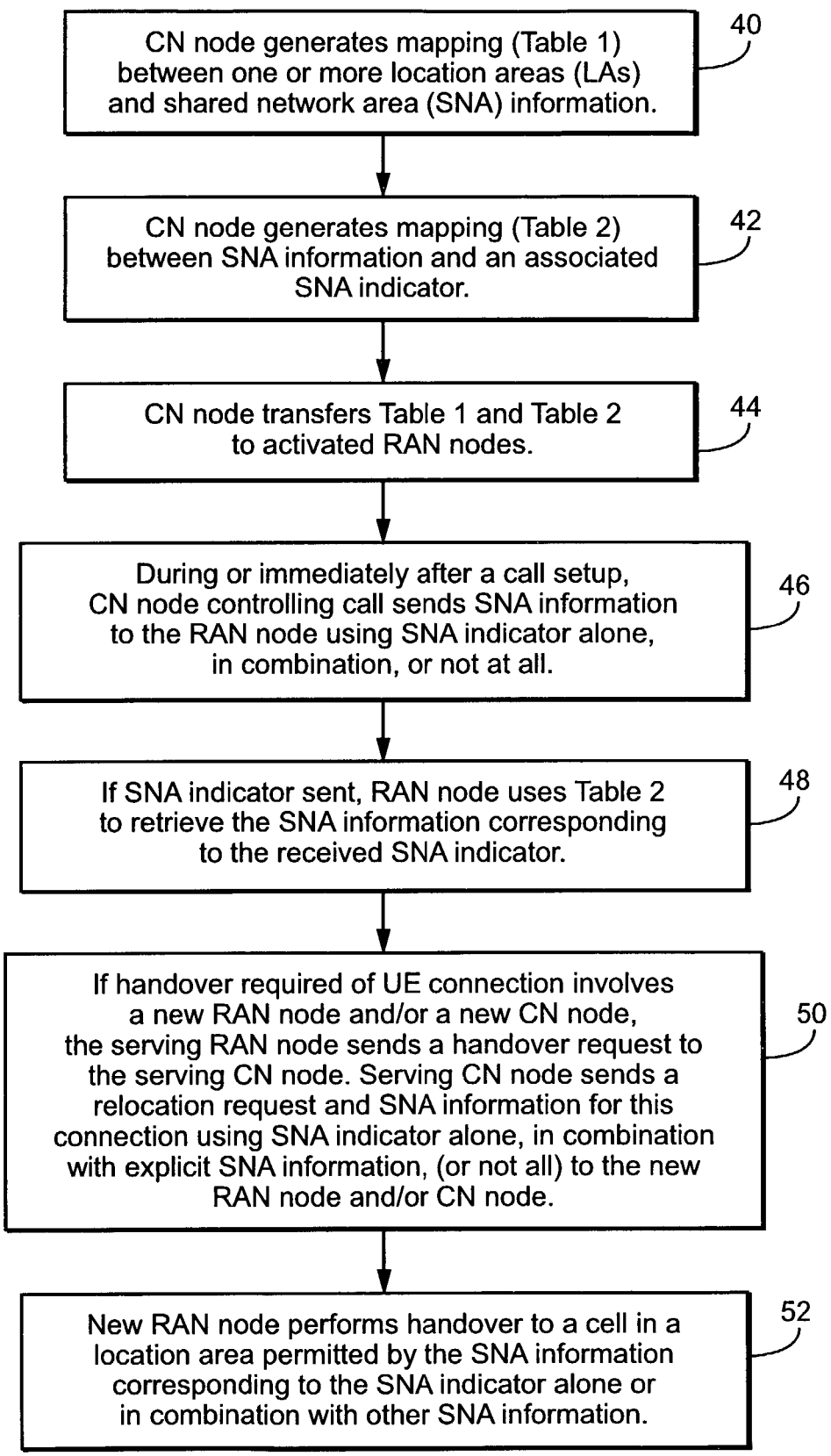
FIG. 6 is a flowchart illustrating example procedures in accordance with one embodiment of the present invention.

The use of mappings and indicators greatly simplifies the signalling process and reduces the bandwidth requirements for regular call connection procedures including call connection setup and call connection handover. Example procedures which incorporate such mappings and indicators are now described in conjunction with the flowchart in FIG. 6. A core network node, such as an MSC, generates a mapping (later referred to as table 1) between location areas (LAs) and shared network area (SNA information) (block 40). The core network node also generates a mapping (later referred to as table 2) between SNA information and an associated SNA indicator (block 42). The core network node transfers both table 1 and table 2 to one or more activated radio access network (RAN) nodes for future use in handling call connections (block 44). During or immediately after a UE call setup, the core network node controlling the call connection indicates the SNA information associated with that UE subscriber to the RAN node using the corresponding SNA indicator (block 46).

The SNA indicator may be sent alone, in combination with other explicit SNA information, or not at all depending on what is desired or appropriate. For example, the core network node may choose whether it wants to send the SNA indicator or instead send the full SNA information. This allows the operator the flexibility of not defining mapping for rarely used or frequently changing SNA information. An SNA indicator may also be combined with explicit SNA information to indicate a particular shared network area not defined explicitly in the mapping table. For example, SNA indicator 1 from FIG. 5 could be sent along with explicit SNA-D1 information to indicate an allowed shared network area SNA-B1, SNA-B2, SNA-R1, SNA-B3 and SNA-D1.

Assuming an SNA indicator is sent, the RAN node uses table 2 to retrieve the SNA information corresponding to the received SNA indicator (block 48). As described above, the mapping tables 1 and 2 have been previously transferred from a core network node to each RAN node in the shared networks. If a handover of the established UE connection involves a new RAN node and/or a new core network node, the serving RAN node sends a handover request to the serving core network node. The serving core network node sends a relocation request and SNA information for this UE subscriber connection using its SNA indicator (alone, in combination with explicit SNA information, or not at all), to the new target RAN node and/or core network node (block 50). The new RAN node performs handover to a cell in a location area permitted by the SNA information corresponding to the SNA indicator alone or in combination with other SNA information (block 52).

The amount of bandwidth used by the SNA access information during call setup and/or handover is greatly reduced from the actual SNA access information that would otherwise have to be sent. As a result, network operators can design shared networks that take advantage of SNA access restriction without having to be concerned with the associated signalling and bandwidth costs. Moreover, network operators need not perform extensive activities to support this functionality on the RAN level. The core network automatically sends the required mapping tables to the RAN nodes when needed or requested. As a result, administrative handling is not required in the core network node to keep track of whether a particular RAN node supports or does not support handling particular shared network area access information.

Figure 7:
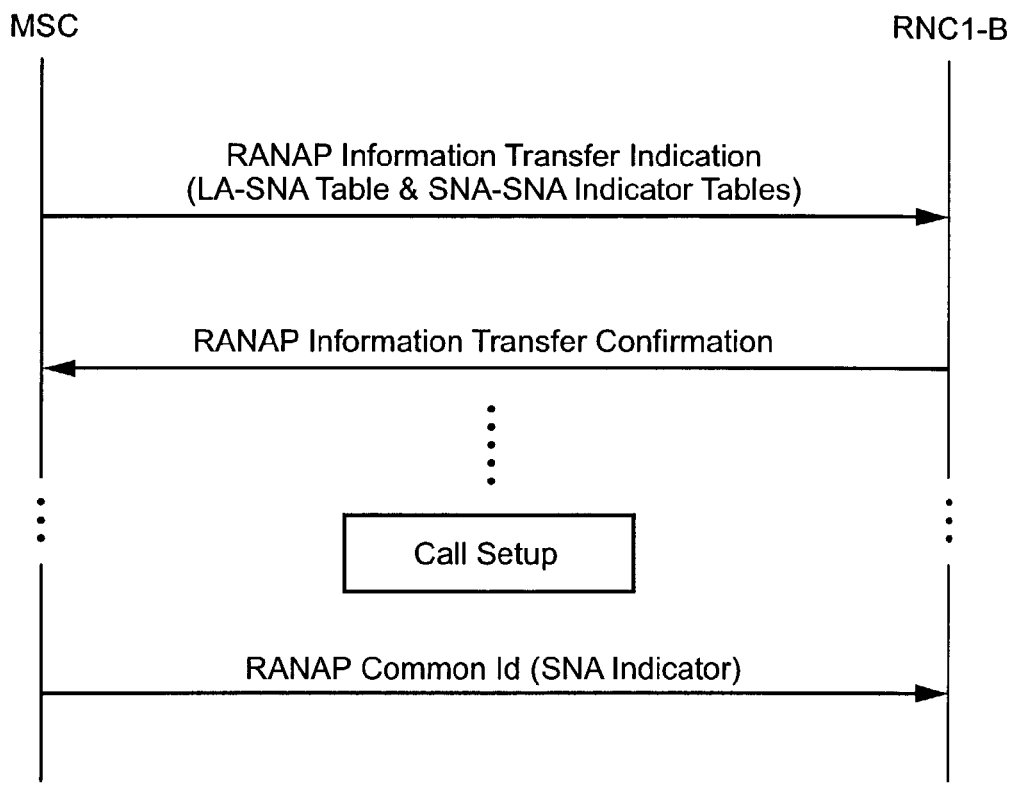
FIG. 7 illustrates one example signaling situation in which an SNA indicator is employed.
Figure 8:
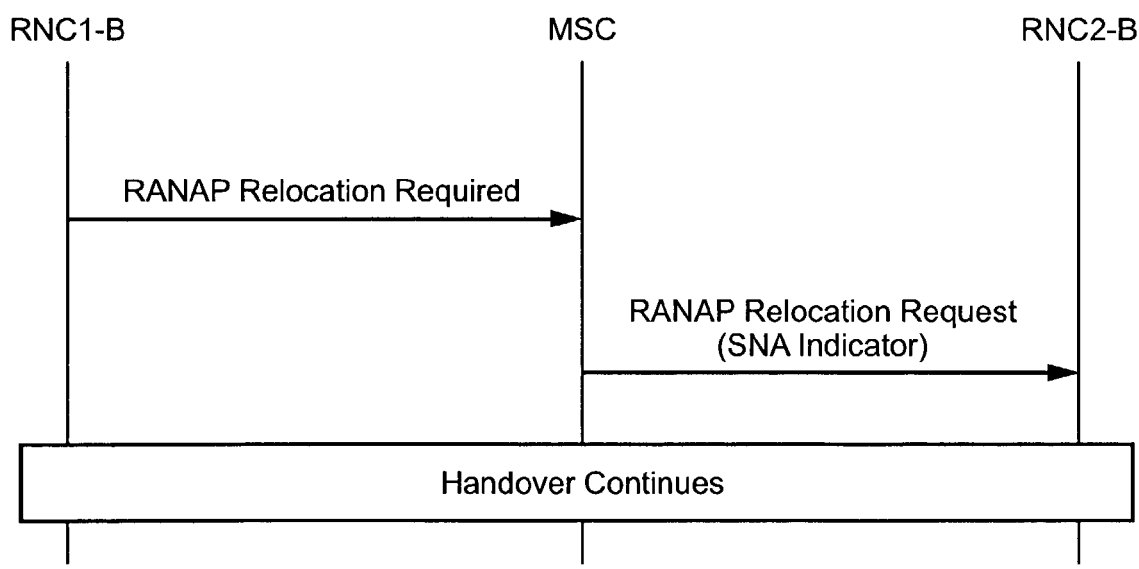
FIG. 8 illustrates a handover signalling scheme involving a signal core network node in which an SNA indicator is employed.
Figure 9:
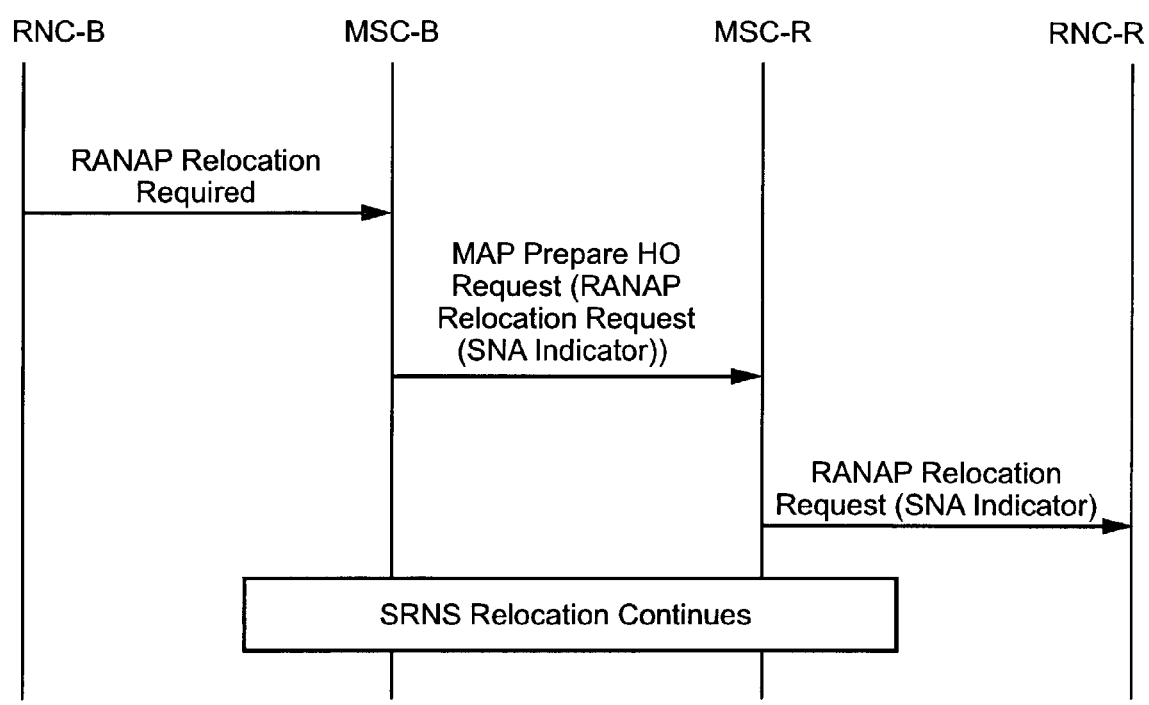
FIG. 9 illustrates an example signaling situation where two core network nodes are involved in which an SNA indicator is employed.

Example signalling situations in which an SNA indicator is employed are now described in conjunction with the signalling diagrams shown in FIGS. 7–9. In these examples, the core network node is an MSC, and the RAN node is a radio network controller (RNC). Moreover, typical UTMS type signaling messages are employed in these examples.

FIG. 7 shows the MSC sending a Radio Access Network Application Part (RANAP) protocol Information Transfer Indication message to the RNC in the blue network (RNC 1-B). A location area-service network area mapping table as well as a service network area-SNA indicator mapping table are included in the message information field. Upon receipt of this message, the RNC responds with an RANAP Information Transfer Confirmation message, informing the MSC that the RNC1-B supports SNA indicator features. Later, when a call connection is being set up or has just been set up which involves the MSC and RNC1-B, the MSC sends to the RNC1-B an RANAP Common ID message that includes the SNA indicator corresponding to the mobile subscriber involved in this call connection. In other words, the RANAP Common ID message need only include an SNA indicator such as "1" or "2" rather than the entire amount shared network access information associated with this mobile subscriber.

Another situation in which the SNA indicator is useful is shown in FIG. 8. In this case, the handover requires a transfer of the connection from RNC1-B in the blue network to RNC2-B also in the blue network. Accordingly, the RNC1-B sends an RANAP Relocation Required message to the MSC which is coupled to both RNCs. The MSC then sends an RANAP Relocation Request message to the new RNC2-B which includes the SNA indicator rather than all of the SNA information associated with this call connection. The handover continues with the RNC2-B using the SNA indicator to look up in its mapping table the corresponding SNA access restriction information for this connection so that candidate cells for the handover can be properly identified in permitted location areas designated by the SNA information for this mobile subscriber.

FIG. 9 illustrates an inter-network handover of the call connection between the blue network and the red network. The RNC-B sends an RANAP Relocation Required message to its MSC-B which then sends a Mobile Application Part (MAP) Prepare Handover Request message to the red network MSC. This MAP message includes an RANAP Relocation Request message that contains the SNA indicator for this mobile subscriber involved in the call connection. The red network MSC then sends an RANAP Relocation Request message that includes this SNA indicator to the target RNC-R in the red network. The RNC-R uses the SNA indicator to access its SNA mapping table to retrieve the necessary shared network area access restriction information for this mobile subscriber in order to select the appropriate candidate cell for handover.

While the present invention has been described with respect to particular embodiments, those skilled in the art will recognize that the present invention is not limited to these specific exemplary embodiments. Different formats, embodiments, and adaptations besides those shown and described as well as many variations, modifications, and equivalent arrangements may also be used to implement the invention. Therefore, while the present invention has been described in relation to its preferred embodiments, it is to be understood that this disclosure is only illustrative and exemplary of the present invention. Accordingly, it is intended that the invention be limited only by the scope of the claims appended hereto.

What is claimed is:

1. A method for use in a shared network mobile communications system including a first network associated with a first operator and a second network associated with a second operator, comprising:
   generating first mapping information associating one or more first sets of location areas in a first shared network area (SNA) with a first SNA identifier so that each first set of location areas has its own corresponding first SNA identifier;
   generating second mapping information associating one or more second sets of location areas in a second shared network area (SNA) with a second SNA identifier so that each second set of location areas has its own corresponding second SNA identifier;
   generating third mapping information that associates one or more of the first SNA identifiers with a first SNA indicator, where the first SNA indicator includes substantially less information than one or more of the first SNA identifiers;
   generating fourth mapping information that associates one or more of the second SNA identifiers with a second SNA indicator, where the second SNA indicator includes substantially less information than one or more of the second SNA identifiers;
   sending a message from a core network node to a first radio network node including the first, second, third, and fourth mapping information;
   for a call connection associated with a mobile subscriber of the first network, sending a handover request message that includes the first SNA indicator, where the handover request is to an SNA coverage area where the first network and second network operators compete; and
   using the first SNA indicator to restrict handover of the call connection to the competing SNA coverage area to a cell in a location area controlled by the first network operator and prevent handover of the call connection to a cell in a location area controlled by the first network operator.

2. The method in claim 1, further comprising:
   setting up the call connection involving using a first radio network node;
   requesting a handover of the call connection to a second radio network node;
   identifying the first mapping information to the second radio network node using the first indicator; and
   selecting a cell for the handover based on the first mapping information.

3. The method in claim 1, wherein the first radio network node and a second radio network node are coupled to a core network node, the method further comprising:
   the core network node receiving a handover request for the call connection from the first radio network node, and
   the core network node sending a handover request message for the call connection to the second radio network node including the first SNA indicator.

4. The method in claim 1, wherein the first radio network node is coupled to a first core network node and a second radio network node is coupled to a second core network node, the method further comprising:
   the first core network node receiving a handover request for the call connection from the first radio network node;
   the first core network node sending a first handover request message for the call connection to the second core network node including the first SNA indicator; and
   the second core network node sending a second handover request message for the call connection to the second radio network node including the first SNA indicator.

5. The method in claim 1, further comprising:
   storing the first, second, third, and fourth mapping information for use at the first radio network node;
   for a call connection request associated with a mobile subscriber of the first network in a particular location area, sending a message to the first radio network node that includes the first SNA indicator to the first radio network node;
   the first radio network node using the first SNA indicator and the stored first and third mapping information to retrieve the one or more sets of location areas associated with the first SNA indicator; and
   the first radio network node using the retrieved one or more sets of location areas to determine whether to grant the call connection request in the particular location area.

6. The method in claim 5, wherein the using step includes using the retrieved one or more sets of location areas associated with the first SNA indicator to determine whether to restrict the handover of the call connection.

7. Apparatus for use in a shared network mobile communications system including a first network associated with a first operator and a second network associated with a second operator, comprising electronic circuitry configured to:
   generate first mapping information associating one or more first sets of location areas in a first shared network area (SNA) with a first SNA identifier so that each first set of location areas has its own corresponding first SNA identifier;
   generate second mapping information associating one or more second sets of location areas in a second shared network area (SNA) with a second SNA identifier so that each second set of location areas has its own corresponding second SNA identifier;
   generate third mapping information that associates one or more of the first SNA identifiers with a first SNA indicator, where the first SNA indicator includes substantially less information than one or more of the first SNA identifiers;
   generate fourth mapping information that associates one or more of the second SNA identifiers with a second SNA indicator, where the second SNA indicator includes substantially less information than one or more of the second SNA identifiers;
   send a message from a core network node to a first radio network node including the first, second, third, and fourth mapping information;
   for a call connection associated with a mobile subscriber of the first network, send a handover request message that includes the first SNA indicator, where the handover request is to an SNA coverage area where the first network and second network operators compete; and use the first SNA indicator to restrict handover of the call connection to the competing SNA coverage area to a cell in a location area controlled by the first network operator and prevent handover of the call connection to a cell in a location area controlled by the first network operator.

8. The apparatus in claim 7, further comprising:

means for setting up the call connection involving using a first radio network node;

means for requesting a handover of the call connection to a second radio network node;

means for identifying the first mapping information to the second radio network node using the first SNA indicator; and means for selecting a cell for the handover based on the first mapping information.

9. The apparatus in claim 7, wherein:

the first radio network node and a second radio network node are coupled to a core network node, the core network node is configured to receive a handover request for the call connection from the first radio network node, and the core network node is configured to send a handover request message for the call connection to the second radio network node including the first SNA indicator.

10. The apparatus in claim 7, wherein:

the first radio network node is coupled to a first core network node and a second radio network node is coupled to a second core network node;

the first core network node is configured to receive a handover request for the call connection from the first radio network node;

the first core network node is configured to send a first handover request message for the call connection to the second core network node including the first SNA indicator; and the second core network node is configured to send a second handover request message for the call connection to the second radio network node including the first SNA indicator.

11. The apparatus in claim 7, further comprising:

means for storing the first, second, third, and fourth mapping information for use at the first radio network node;

for a call connection request associated with a mobile subscriber of the first network in a particular location area, means for sending a message to the first radio network node that includes the first SNA indicator to the first radio network node, and wherein:

the first radio network node is configured to use the first SNA indicator and the stored first and third mapping information to retrieve the one or more sets of location areas associated with the first SNA indicator and to use the retrieved one or more sets of location areas to determine whether to grant the call connection request in the particular location area.

12. The apparatus in claim 11, wherein the first radio network node is configured to use the retrieved the one or more sets of location areas associated with the first SNA indicator to determine whether to restrict the handover of the call connection.

* * * * *